United States Patent
Khan et al.

[15] 3,697,651
[45] Oct. 10, 1972

[54] SALMONELLACIDE COMPOSITION-CONTAINING PROPIONIC ACETIC AND BUTYRIC OR PHOSPHORIC ACIDS

[72] Inventors: Mahmood H. Khan, Chicago; Myron M. Katamay, Oak Forest, both of Ill.

[73] Assignee: Fats and Proteins Research Foundation, Inc., Des Plaines, Ill.

[22] Filed: April 18, 1969

[21] Appl. No.: 817,558

[52] U.S. Cl. ..........................424/128, 99/2, 424/317
[51] Int. Cl. .......................A01n 11/00, A01n 13/00
[58] Field of Search .....................424/128, 317; 99/2

[56] References Cited

UNITED STATES PATENTS

| | | | |
|---|---|---|---|
| 1,589,866 | 6/1926 | Siegler et al. | ...........424/317 X |
| 2,276,234 | 3/1942 | Jone | ..............................47/58 |
| 2,688,585 | 9/1954 | Wilder et al. | .................167/58 |
| 3,115,409 | 12/1963 | Hallinan et al. | ..................99/7 |
| 3,219,453 | 11/1965 | Bogdonoff et al. | ...............99/4 |

*Primary Examiner*—Albert T. Meyers
*Assistant Examiner*—Allen J. Robinson
*Attorney*—Olson, Trexler, Wolters & Bushnell

[57] ABSTRACT

Salmonellacides for use in animal by-product meal materials comprise propionic acid alone and in combination with such complementary acid materials as acetic, butyric, citric, lactic and phosphoric acids.

2 Claims, No Drawings

SALMONELLACIDE COMPOSITION-CONTAINING PROPIONIC ACETIC AND BUTYRIC OR PHOSPHORIC ACIDS

BACKGROUND OF THE INVENTION

This invention relates generally to the preservation of foodstuffs and more particularly to additive materials that are bactericidally effective against *Salmonella* organisms in dry meal products.

Among the pathogenic bacteria of major concern to food and feed processors is the genus *Salmonella*. Unlike certain other pathogens, these bacteria are not endemic to the host organism but are ordinarily introduced through ingestion of contaminated food or water. Once introduced, *Salmonellae* multiply rapidly in the host and are commonly associated with acute intestinal inflammation. Members of this genus are known to cause such diseases as epidemic meat poisoning, paratyphoid fever, parrot fever, white diarrhea of poultry, fowl typhoid and a swine disease resembling hog cholera. The gram-negative *Salmonellae* are also characteristically difficult to destroy, especially in a comparatively dry environment such as animal by-product meal materials, except by heat.

In the past, various procedures have been suggested for *Salmonella* control in these meal materials. However, each has proved to have one or more shortcomings. Sanitation procedures in the processing plant itself have failed to achieve 100 percent effectiveness in that even the most closely controlled operations have experienced occasional batches of recontaminated product. Final heat treatment before shipping cannot prevent recontamination in transit; and both irradiation sterilization and elevated temperature storage are impractically expensive.

It is therefore a general object of the present invention to provide a chemical additive which overcomes the limitations of the prior art procedures and which is capable of both destroying all viable *Salmonella* organisms that are present and protecting the product against subsequent contamination.

Another object of the invention is to provide a *Salmonella* antagonist which does not adversely effect the nutritional quality of the treated food or feed.

Still another object of the invention is to provide a *Salmonella* antagonist which has no adverse effect on the palatability of the treated food or feed.

A further object of the invention is to provide a *Salmonella* antagonist which is non-toxic to the consuming animal.

A still further object of the invention is to provide a *Salmonella* antagonist which is inexpensive and easily applied to the food or feed.

These and other objects and features of the invention will become more apparent from a consideration of the following descriptions.

DETAILED DESCRIPTION OF THE INVENTION

The alkali metal salts of propionic acid have been used heretofore as mold inhibitors in the bread-baking industry, but it has been generally recognized that propionates have essentially no activity against yeasts and little action against bacteria, except for the organism *Bacillus mesentericus* (which causes "rope" in bread). The acid itself is used principally as a commercial esterifying agent in the manufacture of thermoplastics, solvents, synthetic fruit flavors and perfume bases.

The present invention is based on the discovery that propionic acid has unexpected antimicrobial activity against *Salmonella* organisms in animal by-product meal materials and that this activity is markedly enhanced by the presence of certain other low molecular weight organic acids and/or phosphoric acid. The term "animal by-product meal materials" is used herein to describe such edible, nutritious, relatively dry, particulate products as meat-and-bone meal, meat meal, tankage, dried blood, poultry by-product meal, fish meal and the like.

The specific nature of the present invention will now be described with reference to certain bacteriological tests and working examples of the invention.

In the various bacteriological determinations set forth hereinbelow, inoculations were made using *Salmonella* cultures prepared from five *Salmonella-Shigella* serotypes. The individual cultures for this work were obtained from the American Type Culture Collection, Rockville, Md. and were coded as follows:

*Salmonella senftenberg* No. 8400

*Salmonella typhi* No. 6539

*Salmonella choleraesuis* No. 10708

*Salmonella typhimurium* No. 6994

*Shigella flexneri* No. 9199

In preparing the test cultures, one ml. of a fresh, active culture of each of the above five serotypes was introduced into 100 ml. of selenite-cystine broth, and the inoculated broth was then incubated for 48 hours at 37° C.

One common measure of the effectiveness of an antimicrobial agent involves measuring a "zone of inhibition"; and such a measure has been used in certain of the tables set forth hereinafter. The specific procedure employed in these studies was a modification of the method of Vincent and Vincent (Proc. Soc. Exptl. Biol. Med., 55, 162, 1944), and is described as follows: The mixed *Salmonella-Shigella* culture was spread evenly by cotton swabs on the surface of solid, sterile media (20 ml.) in petri plates (100 X 15 mm.). The media used was brilliant green agar. Paper discs 12.7 mm. in diameter were soaked for a few seconds in the test solutions. Three such discs were suspended by forceps and pressed firmly to the surface of the medium in each petri plate. The plates were incubated for 24 hours at 37° C., and the inhibitory effect determined by measuring the diameter of each zone in which growth did not occur.

The foregoing sensitivity test was used to determine the comparative bactericidal effect of propionic acid, and the results are set forth in Table I below.

TABLE I

Bactericidal Effect — Sensitivity Method (Brilliant Green Agar) Individual Acids

| conc. in soln., % by wht. | 1 | 62 5 | 11 10 | 25 |
|---|---|---|---|---|
| zone of inhibition, m.m. | | | | |
| propionic acid | | 19.1 27.3 | 31.4 | TPI* |

| | | | | |
|---|---|---|---|---|
| lactic acid | 15.4 | 21.9 | 26.1 | 31.3 |
| citric acid | 15.3 | 21.8 | 25.8 | 31.8 |

*total plate inhibition

The data set forth in Table I points out the superior antimicrobial activity of propionic acid. While it is not desired to be limited to any particular theory, it is believed that undissociated acid is the bactericidally active substance and it is consequently the characteristically low dissociation constant of propionic acid that makes it uniquely effective.

While propionic acid alone possesses bactericidal effectiveness against *Salmonella* organisms, applicants have found that, at least at low concentrations, it is not always effective in completely destroying *Salmonella* bacteria in heavily contaminated meat-and-bone meal. For example, the previously described, active, mixed culture of *Salmonella-Schigella* was added to sterile meat-and-bone meal at the rate of 10 ml. of culture to 100 g. of the meal material. The sterile meat-and-bone meal was prepared by treating it in an autoclave for 15 minutes at 15 p.s.i.g. (120° C.). Enough physiological saline solution was added to the inoculated meal material to form a thick slurry and the mixture was stirred thoroughly. The mixture was then incubated for 24 hours at 37° C. Additional sterile meat-and-bone meal was then added slowly to the slurry with agitation until the mixture was just moist. It was then dried at 37° C. The selected antagonist material was added to the inoculated meal as a water solution, the solution being slowly poured into the meal material. The resultant mixture was then agitated for a suitable period of time to distribute the antagonist. The results are set forth in Table II below. It can be observed from the tabulations that, while propionic acid showed strong antimicrobial action, complete inhibition was not achieved under the test conditions.

TABLE II

The Influence of Different Concentrations of Individual Acids on Viable Salmonella Organisms in Artificially Contaminated Meat-and-Bone Meal
(Solutions applied at 5% level by weight)

| Acid | Soln. concn. % | Organisms/g. | | | |
|---|---|---|---|---|---|
| | | 24 hrs. | 48 hrs. | 72 hrs. | 1 wk. |
| None | — | 2,800 | 2,700 | 2,900 | 2,600 |
| Propionic | 5 | 1,6000 | 1,300 | 1,700 | 1,400 |
| | 10 | 1,100 | 1,000 | 1,000 | 900 |
| | 25 | 200 | 250 | 200 | 100 |
| Acetic | 5 | 1,900 | 2,000 | 1,800 | 1,700 |
| | 10 | 1,500 | 1,600 | 1,300 | 900 |
| | 25 | 150 | 100 | 150 | 100 |
| Butyric | 5 | 2,500 | 2,000 | 2,300 | 2,100 |
| | 10 | 2,000 | 2,000 | 1,800 | 1,700 |
| | 25 | 500 | 600 | 200 | 300 |
| Phosphoric | 5 | 2,400 | 2,300 | 2,300 | 2,100 |
| | 10 | 2,600 | 1,900 | 2,100 | 2,000 |
| | 25 | 700 | 600 | 300 | 600 |

In making the quantitative estimations of *Salmonella* in meat-and-bone meal, three 10 gram samples, three 1.0 gram samples and three 0.1 gram samples were used for the following enrichment and subculturing procedure: Each sample was added to 225 ml. of lactose broth which was then incubated for 24 hours at 37° C. A first 10 ml. portion of this broth was added to 100 ml. of tetrathionate broth which was then incubated for 24 hours at 37° C. One loopful of this liquid was then streaked on each of the following: brilliant green agar, *Salmonella-Shigella* agar, and eosin methylene blue agar. These plates were then incubated for 24 hours at 37° C. and checked for *Salmonella*-like colonies.

A second 10 ml. portion of incubated lactose broth was at the same time added to selenite-cystine broth which was then processed like the inoculated tetrathionate broth.

The confirmation tests consisted of the following: *Salmonella*-suspect colonies were transferred to 3 ml. samples of brain-heart infusion broth and the tubes incubated for 4—6 hours at 37° C. A sterile wire needle was used to inoculate from the brain-heart infusion broth to a tube slant of triple sugar iron agar. The later tubes were incubated for 24 hours at 37° C. and examined for *Salmonella*-suspect reactions. To the remaining brain-heart infusion broth there was added an equal volume of 0.6 percent formalized physiological saline solution and a check was made for *Salmonella* H antigens using the Spicer-Edwards rapid H identification technique. A check was also made for *Salmonella* O antigens by performing the agglutination tests using a saline suspension prepared from the triple sugar iron agar slant. Where the isolate agglutinates in the Spicer-Edwards antisera test and in one of the group O antisera tests lead to the conclusion that *Salmonella* were present, counts were made. Where the results were doubtful, further biochemical tests (lysine, urea, dulcitol) were conducted using the triple sugar iron slant as the inoculum. The approximate levels of *Salmonella* organisms in the meat-and-bone meal were estimated using the most Probable Number Table of Hoskins, (Pub. Health Rep., 49, 396–7, 1934).

As stated hereinabove, the antimicrobial activity of propionic acid is markedly enhanced by the presence of certain other low molecular weight organic acids and/or phosphoric acid. In accordance with the features of the present invention, the complementary acid material is selected from acetic, butyric, citric, lactic and phosphoric acids; and in a preferred form of the invention two parts of propionic acid are combined with two parts of acetic or lactic acid and with one part of phosphoric, butyric or citric acid.

The effectiveness of the acid compositions of the invention is illustrated in Tables III and IV, the specific combination of acids employed in the studies which resulted in the data shown in Table III being set forth in Table V.

TABLE III

Influence of Different Concentration of Acid Mixtures on Viable Salmonella Organisms in Artificially Contaminated Meat-and-Bone Meal

| Acid Mixture | concn. in M&B meal | Organisms/g. | | | | |
|---|---|---|---|---|---|---|
| | | 0 hrs. | 24 hrs. | 48 hrs. | 72 hrs. | 1 week |
| | 0 | 1,800 | 1,700 | 1,500 | 2,000 | 1,900 |
| Formula B | 1 | 20 | 20 | 10 | 10 | 10 |
| | 3 | 10 | 10 | 0 | 0 | 0 |
| | 5 | 0 | 0 | 0 | 0 | 0 |
| | 7 | 0 | 0 | 0 | 0 | 0 |
| | 10 | 0 | 0 | 0 | 0 | 0 |

| Formula C | 0 | 1,700 | 1,900 | 1,600 | 2,000 | 1,800 |
|---|---|---|---|---|---|---|
| | 1 | 30 | 30 | 20 | 20 | 20 |
| | 3 | 20 | 20 | 20 | 20 | 20 |
| | 5 | 0 | 0 | 0 | 0 | 0 |
| | 7 | 0 | 0 | 0 | 0 | 0 |
| | 10 | 0 | 0 | 0 | 0 | 0 |

TABLE IV

Bactericidal Effect — Sensitivity Method (Brilliant Green Agar) Acid Combinations

| concentration | | | | zone of inhibition | |
|---|---|---|---|---|---|
| propionic acid | lactic acid | citric acid | total acid | water | (m.m.) |
| 3 | 8 | 4 | 15 | 85 | 27.3 |
| 9 | 6 | 3 | 18 | 82 | 32.0 |
| 10 | 7 | 3 | 20 | 80 | 34.0 |
| 9.5 | 6.5 | 2 | 18 | 82 | 31.0 |
| 7 | 7 | 6 | 20 | 80 | 33.7 |
| 9.5 | 8.5 | 1 | 19 | 81 | 33.7 |
| 9.5 | 9.5 | — | 19 | 81 | 33.3 |
| 9.5 | 9 | 2.5 | 21 | 79 | 34.0 |
| 9 | 9 | 2.0 | 20 | 80 | 37.0 |
| 10 | 10 | 5.0 | 25 | 75 | 38.7 |

TABLE V

Composition (per cent by weight)

| | propionic | acetic | butyric | phosphoric | citric | lactic | water |
|---|---|---|---|---|---|---|---|
| Formula A | 10 | — | — | — | 5 | 10 | 75 |
| Formula B | 10 | 10 | 5 | — | — | — | 75 |
| Formula C | 10 | 10 | — | 5 | — | — | 75 |

The data set forth in Table III was accumulated using the procedures previously described with reference to Table II whereas the data shown in Table IV was generated using the procedures previously described with reference to Table I.

Table III clearly indicates the bactericidal effect of compositions comprising propionic acid and combinations of acetic, butyric and phosphoric acids, this effectiveness being rapid and substantially complete in additions to meat-and-bone meal at the 5 percent level by weight. Compositions incorporating propionic acid and combinations of lactic and citric acids are also highly effective as is shown by the data in Table IV.

TABLE VI

Influence of Formula A on *Salmonella* Counts in Artificially Contaminated Meat Meal

| Concentration of Formula A % | *Salmonella* Count Per Gram | | | | |
|---|---|---|---|---|---|
| | initial | 24 hrs. | 48 hrs. | 72 hrs. | 1 week |
| 0 (Control) | 1,900 | 1,700 | 1,800 | 2,000 | 2,100 |
| 1 | 40 | 20 | 30 | 20 | 20 |
| 3 | 30 | 30 | 20 | 10 | 10 |
| 5 | 0 | 0 | 0 | 0 | 0 |
| 10 | 0 | 0 | 0 | 0 | 0 |

A consideration of Tables III and VI shows that the antimicrobial compositions of the invention have effectiveness at even the 1 percent level when a 25 percent active material is used for the treatment. These tables further indicate that the acid compositions of the invention achieve complete destruction of *Salmonella* organisms at between the 3 and 5 percent levels of addition, that is, when approximately 1¼ percent of active material is introduced into the meal.

Other studies have established that the bactericidal effect of the materials of the instant invention is not the result of a mere alteration in the acidity level. For example, the pH of treated meat-and-bone meal is approximately 4.5; and acidity alone in the range of pH 2.5 to 8.5 has been found to have no effect on the growth of *Salmonellae*.

Feeding trials with chicks have shown that acid treatment of meat-and-bone meal in accordance with the present invention has no adverse effect either on the acceptability of rations containing the meal or on the nutritional efficiency of such rations. Furthermore, the acid treatment of the invention produces no unacceptable effect on the moisture, fat or protein content of the meal with additions as high as 1¼ percent of active material. Residual effectiveness has been established by studies in which attempts to contaminate previously treated meal failed.

Incorporation of the bactericides of the invention may be achieved by the spraying of water solutions of the ingredients into an actively mixing meal, in addition to the mixing procedures described previously.

While particular embodiments of the invention have been described hereinabove, it should be understood, of course, that the invention is not limited thereto since many modifications may be made; and it is therefore contemplated to cover by the present application, any such modifications as fall within the true spirit and scope of the appended claims.

The invention is claimed as follows:

1. A salmonellacide composition comprising two parts of propionic acid, two parts of acetic acid and one part of phosphoric acid.

2. A salmonellacide composition comprising two parts of acetic acid and one part of butyric acid.

* * * * *